(12) United States Patent
McMahon et al.

(10) Patent No.: US 10,205,898 B2
(45) Date of Patent: Feb. 12, 2019

(54) MINIMIZING A DATA PEDESTAL LEVEL IN AN IMAGE SENSOR

(71) Applicant: Apple Inc., Cupertino, CA (US)

(72) Inventors: Andrew Kenneth John McMahon, Cupertino, CA (US); D. Amnon Silverstein, Cupertino, CA (US); David R. Pope, Cupertino, CA (US); Suk Hwan Lim, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/882,361

(22) Filed: Oct. 13, 2015

(65) Prior Publication Data
US 2016/0105621 A1  Apr. 14, 2016

Related U.S. Application Data

(60) Provisional application No. 62/063,866, filed on Oct. 14, 2014.

(51) Int. Cl.
*H04N 5/361* (2011.01)
*H04N 5/378* (2011.01)

(52) U.S. Cl.
CPC .............. *H04N 5/361* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 7,349,574 B1 * | 3/2008 | Sodini | G06T 5/009 345/589 |
| 8,128,890 B2 * | 3/2012 | Droog | G01N 15/1463 382/128 |
| 8,957,358 B2 | 2/2015 | Wan et al. | |
| 10,026,771 B1 | 7/2018 | Lee et al. | |
| 2005/0002448 A1 | 1/2005 | Knight et al. | |

(Continued)

FOREIGN PATENT DOCUMENTS

WO  WO 15/005959  1/2015

OTHER PUBLICATIONS

Charlet et al., "Chip-to-chip interconnections based on the wireless capacitive coupling for 3D integration," Microelectronic Engineering, vol. 83, 2006, pp. 2195-2199.

*Primary Examiner* — Mark T Monk
(74) *Attorney, Agent, or Firm* — Brownstein Hyatt Farber Schreck, LLP

(57) ABSTRACT

A pedestal level for an image sensor can be dynamically adjusted based on one or more parameters. The parameters include one or more operating conditions associated with the image sensor, pre-determined image sensor characterization data, the number of unused digital codes, and/or the number of clipped pixel signals. The operating conditions can include the temperature of the image sensor, the gain of at least one amplifier included in processing circuitry operably connected to at least one pixel, and/or the length of the integration period for at least one pixel in the image sensor. Based on the one or more of the parameters, the pedestal level is adjusted to reduce a number of unused digital codes in a distribution of dark current. Additionally or alternatively, the variance of the pixel signals can be reduced to permit the use of a lower pedestal level.

19 Claims, 11 Drawing Sheets

(56) References Cited

U.S. PATENT DOCUMENTS

| | | | |
|---|---|---|---|
| 2008/0054320 A1* | 3/2008 | Solhusvik | H04N 5/3575 257/292 |
| 2009/0021606 A1* | 1/2009 | Kuruma | H04N 5/3653 348/231.99 |
| 2012/0133803 A1* | 5/2012 | Lee | H04N 5/361 348/243 |
| 2012/0262408 A1 | 10/2012 | Pasquero et al. | |
| 2015/0115386 A1 | 4/2015 | Chuang et al. | |
| 2015/0349005 A1 | 12/2015 | Yamashita et al. | |
| 2017/0316248 A1 | 11/2017 | Yi et al. | |

* cited by examiner

MINIMIZING A DATA PEDESTAL LEVEL IN AN IMAGE SENSOR

CROSS-REFERENCE TO RELATED APPLICATION(S)

This application claims the benefit under 35 U.S.C. § 119(e) of U.S. Provisional Patent Application No. 62/063,866, filed on Oct. 14, 2014, and entitled "Reducing Data Pedestal In An Image Sensor," which is incorporated by reference as if fully disclosed herein.

FIELD

The described embodiments relate generally to image sensors. More particularly, the present embodiments relate to minimizing a pedestal level in an image sensor.

BACKGROUND

An image sensor typically includes an array of pixels. When an image of a scene is to be captured by the image sensor, each pixel accumulates photo-generated charge based on the amount of light striking the pixel. The time in which the pixels collect photo-generated charge is known as the integration period. The pixels (or circuitry outside of the pixels) convert the image charge into image signals that are processed and combined to produce the image.

Pixels are non-ideal circuits that can experience varying amounts of dark current. Dark current represents charge that is accumulated by a pixel regardless of whether light is incident on the pixel or not. Dark current accumulates with, and is indistinguishable from, the image charge. The amount of dark current that accumulates in each pixel is dependent on several operating conditions, including the temperature of the image sensor, the length of the integration time, and the gain value(s) applied to the pixel signal when the pixel signal is readout of the pixel. Dark current typically increases as the temperature of the image sensor rises, usually doubling every +6 or +7 degrees Celsius. Additionally, the length of an integration period can affect how much dark current accumulates during an exposure period (the amount of time the pixels are exposed to light).

Each pixel can experience a slightly different amount of dark current. For a group of pixels, the distribution of the dark current typically follows a Poisson distribution (see e.g., 100 and 102 in FIG. 1). As the temperature of the image sensor increases, the length of the integration period increases, and/or the gain increases, the standard deviation of the dark current distribution increases. For example, as shown in FIG. 1, the standard deviation of the dark current distribution at a lower temperature, a short integration period, and/or a lower gain (see plot 100) is less than the standard deviation at a higher temperature, a longer integration period, and/or a higher gain (see plot 102).

The pixels in a digital image are typically represented with digital values or codes. To preserve the distribution of the dark current, a black level control circuit (or another component) typically controls the mean of the dark current such that the mean is maintained at some positive value within the digital code range. This positive level 104 is often referred to as the "pedestal" and is typically chosen so that the distribution at the worst operating condition (e.g., high temperature, high gain, and high integration period) prevents pixel signals from clipping at zero. The pedestal level 104 is then maintained at a fixed value under all operating conditions of the image sensor. The black level control circuit adds or subtracts an offset value to the dark current to make the mean of the dark current be substantially equal to the pedestal level 104.

As shown in FIG. 2, if pixel signals begin to clip at zero, the mean of the dark current 200 shifts because the negative pixels are not preserved. Further, the distribution of the dark current 202 no longer follows a Poisson distribution. The shifted mean 200 can result in color reproduction issues in images captured by the image sensor.

Additionally, when the accumulation of dark current is low due to a short integration period, a lower temperature, and/or a lower gain, the standard deviation is lower and the pedestal level 104 can be higher than necessary, which results in digital codes being wasted or not used (see e.g., plot 100 and area 106 in FIG. 1). When digital codes are wasted, the meaningful signal (the signal above the pedestal level 104) is supported by fewer digital codes than otherwise can be used, which may increase the quantization noise of the signal.

SUMMARY

Embodiments described herein dynamically adjust a pedestal level based on one or more parameters or characteristics associated with an image sensor. The parameters include one or more operating conditions, pre-determined image sensor characterization data, the number of unused digital codes, and/or the number of clipped pixel signals. The operating conditions can include the temperature of the image sensor, the gain of at least one amplifier included in processing circuitry operably connected to at least one pixel, and/or the length of the integration period for at least one pixel in the image sensor.

The pedestal level can be adjusted to reduce the number of unused digital codes in the dark current distribution. Additionally or alternatively, the variance of the pixel signals can be reduced to permit an even lower pedestal level to be used. For example, in one embodiment the standard deviation of the pixel signals near the pedestal level can be reduced. Reducing the standard deviation can permit an even lower pedestal level to be used because fewer digital codes are needed to represent the pixel signals below the pedestal level.

In one aspect, a system can include a pixel array configured to capture images, processing circuitry operably connected to the pixel array, a temperature sensor, and a black level control circuit. A processor is operably connected to the processing circuitry, the temperature sensor, and the black level control circuit. The one or more operating conditions can include a temperature of the image sensor, a length of an integration period of at least one pixel in the pixel array, and a gain of at least one amplifier in the processing circuitry. The processor is configured to receive temperature data from the temperature sensor, to determine a gain of at least one amplifier in the processing circuitry, and to determine an integration period of at least one pixel in the pixel array. Based on at least one operating condition, the processor is configured to determine an expected distribution of dark current and an adjustment amount for the pedestal level based on the expected distribution of the dark current. The processor may be further configured to adjust the pedestal level based on the adjustment amount.

In another aspect, a method of dynamically adjusting a pedestal level for an image sensor includes receiving, by a processor, data relating to one or more operating conditions associated with the image sensor. An expected distribution of dark current for the image sensor can be determined by the processor based on the one or more operating conditions. An adjustment amount for the pedestal level may then be determined by the processor based on the expected distribution of dark current. In some embodiments, the processor can adjust the pedestal level based on the adjustment amount. In other embodiments, the processor can instruct the image sensor to select a different (e.g., higher or lower) pedestal level based on the adjustment amount.

Additionally or alternatively, the number of unused digital codes and/or the number of pixel signals that are clipped may be monitored by a processor or other suitable electronic component. A determination can be as to whether the number of unused digital codes and/or clipped pixel signals equals or exceeds a threshold amount. When the number of unused digital codes and/or clipped pixel signals equals or exceeds the threshold amount, an adjustment amount for the pedestal level can be determined by the processor. In some embodiments, the processor can adjust the pedestal level based on the adjustment amount. In other embodiments, the processor can instruct the image sensor to select a different (e.g., higher or lower) pedestal level based on the adjustment amount.

In yet another aspect, a method for reducing a pedestal level used by an image sensor can include receiving a subset of pixel signals in an image. In some embodiments, the subset of pixels may be associated with a single color in a color filter array. For example, if the color filter array is a Bayer color filter, the subset of pixels can all be associated with the color green, the color red, or the color blue. Each of the pixel signals in the subset of the pixel signals is compared to a given pixel signal in the subset of the pixel signals to determine if a difference between each pixel signal and the given pixel signal is less than a first threshold. If the difference between a respective pixel signal in the subset of pixels signals and the given pixel signal is less than the first threshold, the respective pixel signal is included in a calculation of an average of the pixel signals in the subset of pixel signals that are less than the first threshold. Essentially, the average is an average of the given pixel signal and all of the other pixel signals in the subset that have a value that is close to the given pixel signal by the first threshold. The average represents a replacement pixel signal. All of the pixel signals in the subset of the pixel signals are also compared to a second threshold to determine if at least one pixel signal in the subset of the pixel signals is less than the second threshold. If so, the replacement pixel signal is output for a pixel signal. If none of the pixel signals in the subset of pixel signals are less than the second threshold, the given pixel signal is output for the pixel signal. After all of the pixels in the image have been filtered, the pedestal level may be reduced. The reduced pedestal level can then be added to the pixel signals.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein dynamically adjust a pedestal level to minimize the number of digital codes that may be wasted or not used. In particular, the pedestal level may be adjusted to minimize the number of digital codes below the pedestal level to only those digital codes needed to represent the lower side of the dark current distribution. This can also minimize or prevent dark current signals from clipping at zero.

In one embodiment, a processor can receive data relating to one or more operating conditions of an image sensor. Example operating conditions include the temperature of the image sensor, the gain of at least one amplifier in processing circuitry operably connected to the pixels, and the length of the integration period for the pixels in the image sensor. Based on the operating conditions, the processor can adjust the pedestal level dynamically such that the pedestal level changes as the operating conditions change. The processor may adjust the pedestal level continuously or at select times while an image sensor is operating.

In another embodiment, a processor may monitor the number of unused digital codes and/or the number of pixel signals that are clipped to determine if a pedestal level should be adjusted. When the number of unused digital codes and/or the number of clipped pixel signals equals or exceeds a threshold amount, the pedestal level may be adjusted to reduce the number of unused digital codes and/or clipped pixel signals.

In other embodiments, data relating to one or more operating conditions, the number of clipped pixel signals, and/or the number of unused digital codes, either individually or in various combinations, can be analyzed or monitored to determine whether a pedestal level in an image sensor should be adjusted.

Additionally or alternatively, the variance of the pixel signals can be reduced to permit a lower pedestal level to be used. For example, in one embodiment the standard deviation of the pixel signals close to the pedestal level may be reduced to reduce the number of digital codes needed to represent the pedestal region (the region near the pedestal level). Reducing the number of digital codes needed to represent the pedestal region can permit the pedestal level to be reduced.

These and other embodiments are discussed below with reference to FIGS. 3-13. However, those skilled in the art will readily appreciate that the detailed description given herein with respect to these Figures is for explanatory purposes only and should not be construed as limiting.

Figure 3:
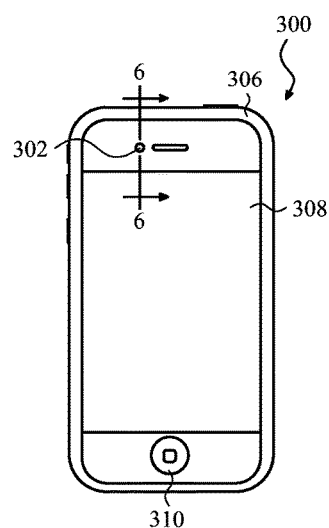
FIG. 3 shows a front perspective view of an electronic device that can include one or more cameras.
Figure 4:
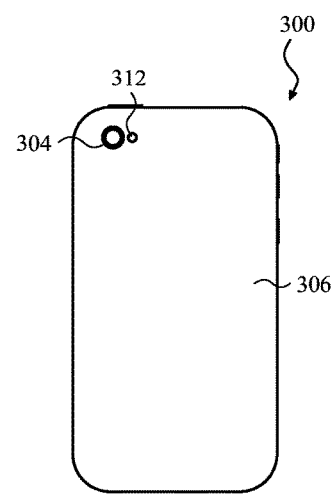
FIG. 4 shows a rear perspective view of the electronic device of FIG. 3.

Referring now to FIGS. 3 and 4, there are shown front and rear perspective views of an electronic device that can include one or more cameras. The electronic device 300 includes a first camera 302, a second camera 304, an enclosure 306, a display 308, an input/output (I/O) device 310, and an optional flash 312 or light source for the camera or cameras. The electronic device 300 can also include one or more internal components (not shown) typical of a computing or electronic device, such as, for example, one or more processors, memory components, network interfaces, and so on.

In the illustrated embodiment, the electronic device 300 is depicted as a smart telephone. Other embodiments, however, are not limited to this construction. Other types of computing or electronic devices can include one or more cameras, including, but not limited to, a netbook or laptop computer, a tablet computing device, a digital camera, a wearable electronic or communication device, a scanner, a video recorder, and a copier.

The enclosure 306 can form an outer surface or partial outer surface for the internal components of the electronic device 300, and may at least partially surround the display 308. The enclosure 306 can be formed of one or more components operably connected together, such as a front piece and a back piece. Alternatively, the enclosure 306 can be formed of a single piece operably connected to the display 308.

The I/O device 310 can be implemented with any type of input and/or output device. By way of example only, the I/O device 310 is shown as a button, but in other embodiments the I/O device can be a switch, a capacitive sensor, or other input mechanism. The I/O device 310 allows a user to interact with the electronic device 300. For example, the I/O device 310 may be a button or switch to alter the volume, return to a home screen, and the like. The electronic device 300 can include one or more input devices and/or output devices, and each device can have a single I/O function or multiple I/O functions. Example I/O devices include a microphone, speakers, a touch sensor, network or communication ports, and wireless communication devices.

The display 308 can be operably or communicatively connected to the electronic device 300. The display 308 can be implemented with any type of suitable display, such as a retina display, a color liquid crystal display (LCD), or an organic light-emitting display (OLED). The display 308 can provide a visual output for the electronic device 300 or function to receive user inputs to the electronic device. For example, the display 308 can be a multi-touch capacitive sensing touchscreen that can detect one or more user touch and/or force inputs.

Figure 5:
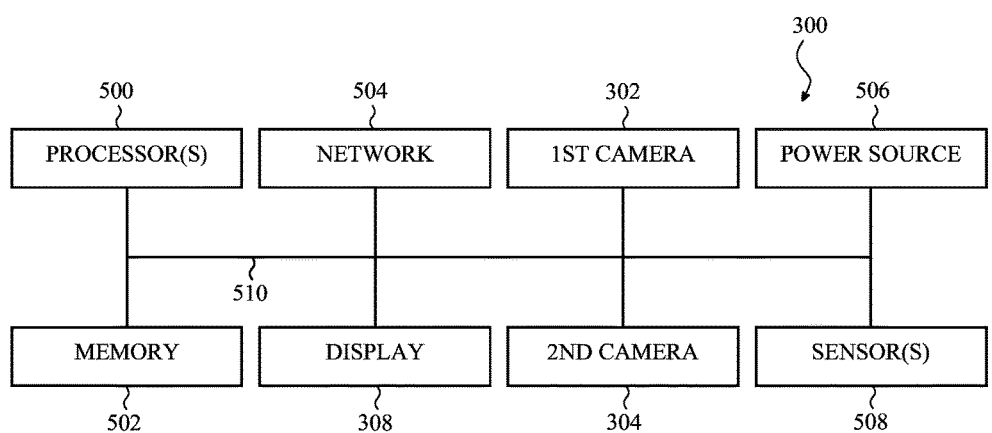
FIG. 5 shows a simplified block diagram of the electronic device of FIG. 3.

The electronic device 300 can also include a number of internal components. FIG. 5 illustrates one example of a simplified block diagram of the electronic device 300. The electronic device can include one or more processors 500, storage or memory components 502, network interface 504, power source 506, and sensors 508, each of which will be discussed in turn below.

The one or more processors 500 can control some or all of the operations of the electronic device 300. The processor(s) 500 can communicate, either directly or indirectly, with substantially all of the components of the electronic device 300. For example, one or more system buses 510 or other communication mechanisms can provide communication between the processor(s) 500, the cameras 302, 304, the display 308, the network interface 504, the power source 506, and/or the one or more sensors 508. The processor(s) 500 can be implemented as any electronic device capable of processing, receiving, or transmitting data or instructions. For example, the one or more processors 500 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 502 can store electronic data that can be used by the electronic device 300. For example, the memory 502 can store electrical data or content such as, for example, audio files, document files, timing and control signals, and image data. The memory 502 can be configured as any type of memory. By way of example only, memory 502 can be implemented as random access memory, read-only memory, Flash memory, removable memory, or other types of storage elements, in any combination.

The network interface 504 can receive data from a user or one or more other electronic devices. Additionally, the network interface 304 can facilitate transmission of data to a user or to other electronic devices. For example, in embodiments where the electronic device 300 is a smart telephone, the network interface 504 can receive data from a network or send and transmit electronic signals via a wireless or wired connection. Examples of wireless and wired connections include, but are not limited to, cellular, WiFi, Bluetooth, and Ethernet. In one or more embodiments, the network interface 504 supports multiple network or communication mechanisms. For example, the network interface 504 can pair with another device over a Bluetooth network to transfer signals to the other device while simultaneously receiving signals from a WiFi or other wired or wireless connection.

The one or more power sources 506 can be implemented with any device capable of providing energy to the electronic device 300. For example, the power source 506 can be a battery. Additionally or alternatively, the power source can be a wall outlet that the electronic device connects to with a power cord. Additionally or alternatively, the power source can be another electronic device that the electronic device 300 connects to via a wireless or wired connection (e.g., a connection cable), such as a Universal Serial Bus (USB) cable.

The one or more sensors 508 can by implemented with any type of sensor. Example sensors include, but are not limited to, an audio sensor (e.g., microphones), a light sensor (e.g., ambient light sensors), gyroscope(s), accelerometer(s), and a biometric sensor. The one or more sensors 508 can be used to provide data to the processor 500, which may be used to enhance or vary functions of the electronic device 300.

Figure 6:
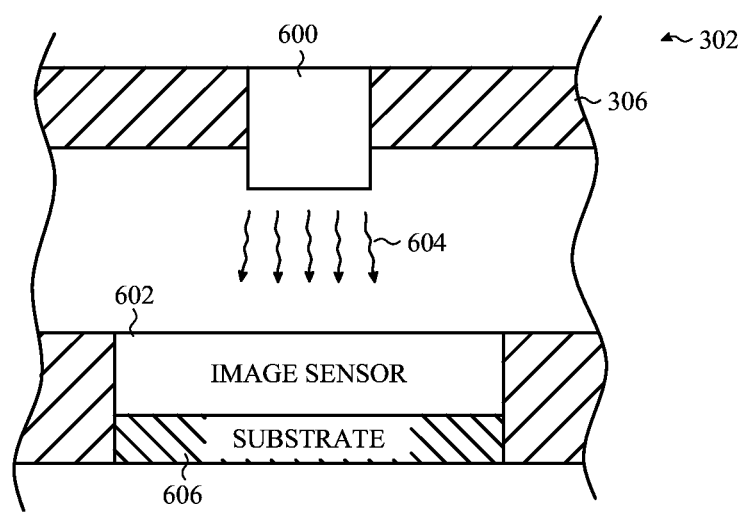
FIG. 6 shows a cross-section view of the electronic device taken along line 6-6 in FIG. 3.

As described with reference to FIGS. 3 and 4, the electronic device 300 includes one or more cameras 302, 304 and an optional flash 312 or light source for the camera or cameras. FIG. 6 is a simplified cross-section view of the camera 302 taken along line 6-6 in FIG. 3. Although FIG. 6 illustrates the first camera 302, those skilled in the art will recognize that the second camera 304 can be substantially similar to the first camera 302. In some embodiments, one camera may include a global shutter configured image sensor and one camera can include a rolling shutter configured image sensor. In other examples, one camera can include an image sensor with a higher resolution than the image sensor in the other camera, or the image sensors can be configured as two different types of image sensors (e.g., CMOS and CCD).

The camera 302 includes an imaging stage 600 that is in optical communication with an image sensor 602. The imaging stage 600 is operably connected to the enclosure 306 and positioned in front of the image sensor 602. The imaging stage 600 can include conventional elements such as a lens, a filter, an iris, and a shutter. The imaging stage 600 directs, focuses, or transmits light 604 within its field of view onto the image sensor 602. The image sensor 602 captures one or more images of a subject scene by converting the incident light into electrical signals.

The image sensor 602 is supported by a support structure 606. The support structure 606 can be a semiconductor-based material including, but not limited to, silicon, silicon-on-insulator (SOI) technology, silicon-on-sapphire (SOS) technology, doped and undoped semiconductors, epitaxial layers formed on a semiconductor substrate, well regions or buried layers formed in a semiconductor substrate, and other semiconductor structures.

Various elements of the imaging stage 600 or the image sensor 602 can be controlled by timing signals or other signals supplied from a processor or memory, such as processor 500 in FIG. 5. Some or all of the elements in the imaging stage 600 can be integrated into a single component. Additionally, some or all of the elements in the imaging stage 600 can be integrated with the image sensor 602, and possibly one or more additional elements of the electronic device 300, to form a camera module. For example, a processor or a memory may be integrated with the image sensor 602 in some embodiments.

Figure 7:
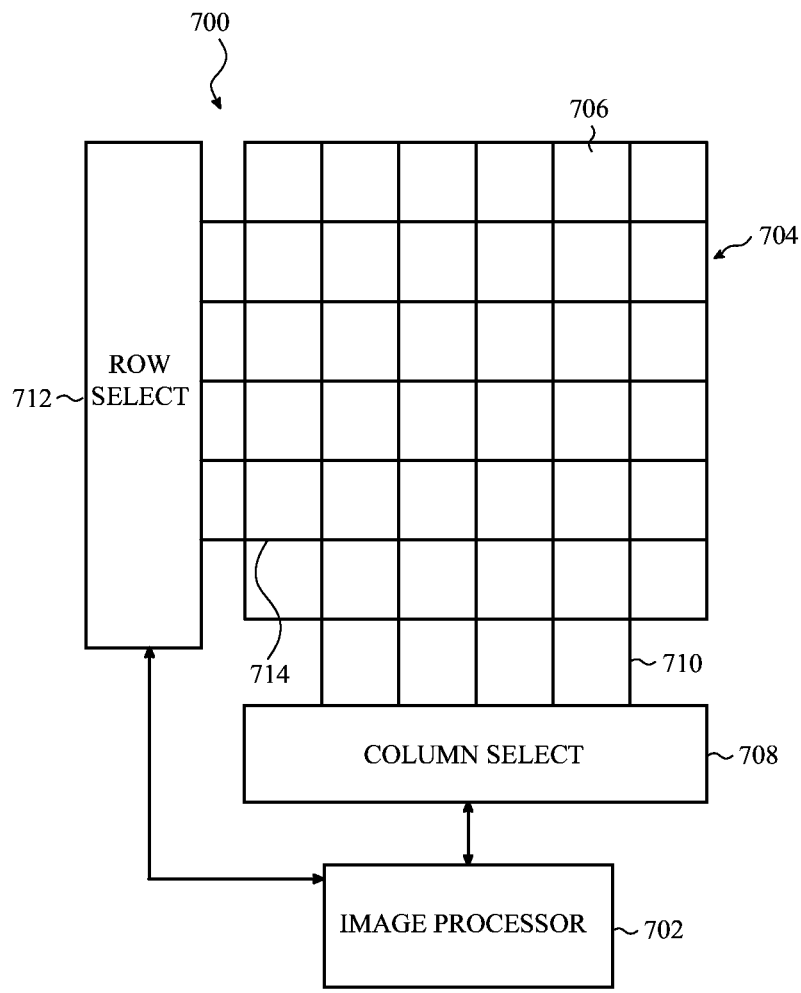
FIG. 7 shows a simplified block diagram of one example of an image sensor.

Referring now to FIG. 7, there is shown a top view of one example of an image sensor suitable for use as image sensor 602 shown in FIG. 6. The illustrated image sensor is a complementary metal-oxide semiconductor (CMOS) image sensor. The image sensor 700 can include an image processor 702 and a pixel array 704 that includes multiple pixels 706. In the illustrated embodiment, the pixel array 704 is configured in a row and column arrangement. However, other embodiments are not limited to this configuration. The pixels 706 in a pixel array 704 can be arranged in any suitable configuration, such as, for example, a hexagon configuration.

The pixel array 704 may be in communication with a column select element 708 through one or more output lines 710. The pixel array 704 can also be in communication with a row select element 712 through one or more row select lines 714. The row select element 712 includes one or more row select circuits that selectively activates a particular pixel 706 or group of pixels, such as all of the pixels 706 in a certain row. The column select element 708 includes one or more column select and/or processing circuitry that selectively receives the signals output from the select pixels 706 or groups of pixels (e.g., all of the pixels in the selected row) and processes the signals (e.g., amplifies the signals).

The row select element 712 and/or the column select element 708 may be in communication with the image processor 702. The image processor 702 can provide signals to the row select element 712 and the column select element 708 to transfer charge and readout the signals representing the amount of charge collected by the pixels 706. The image processor 702 can process data from the pixels 706 and provide that data to the processor 500 and/or other components of the electronic device 300. It should be noted that in some embodiments, the image processor 702 can be incorporated into the processor 500 or separate therefrom.

Figure 8:
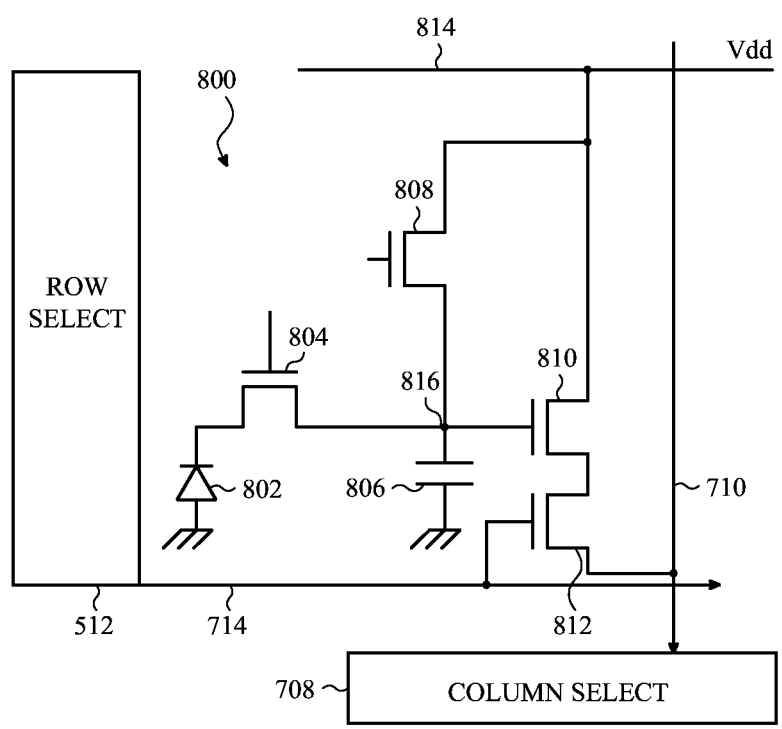
FIG. 8 shows a simplified schematic view of a pixel suitable for use in an image sensor.

Referring now to FIG. 8, there is shown a simplified schematic view of a pixel that is suitable for use as pixels 706 shown in FIG. 7. The pixel 800 includes a photodetector 802, a transfer transistor 804, a sense region 806, a reset transistor 808, a readout transistor 810, and a row select transistor 812. The sense region 806 is represented as a capacitor in the illustrated embodiment because the sense region 806 can temporarily store charge received from the photodetector 802. As described below, after charge is transferred from the photodetector 802, the charge can be stored in the sense region 806 until the gate of the reset transistor 808 is pulsed to reset the voltage on the sense region. The charge in the sense region 806 is read out when the gate of the row select transistor 812 is pulsed.

One terminal of the transfer transistor 804 is connected to the photodetector 802 while the other terminal is connected to the sense region 806. One terminal of the reset transistor 808 and one terminal of the readout transistor 810 are connected to a supply voltage (Vdd) 814. The other terminal of the reset transistor 808 is connected to the sense region 806, while the other terminal of the readout transistor 810 is connected to a terminal of the row select transistor 812. The other terminal of the row select transistor 812 is connected to an output line 710.

By way of example only, in one embodiment the photodetector 802 is implemented as a photodiode or pinned photodiode, the sense region 806 as a floating diffusion, and the readout transistor 810 as a source follower transistor. The photodetector 802 can be an electron-based photodiode or a hole based photodiode. It should be noted that the term photodetector as used herein is meant to encompass substantially any type of photon or light detecting component, such as a photodiode, pinned photodiode, photogate, or other photon sensitive region. Additionally, the term sense region as used herein is meant to encompass substantially any type of charge storing or charge converting region.

Those skilled in the art will recognize that the pixel 800 can be implemented with additional or different components in other embodiments. For example, a row select transistor can be omitted and a pulsed power supply mode used to select the pixel, the sense region can be shared by multiple photodetectors and transfer transistors, and/or some or all of the readout circuitry (e.g., the reset and readout transistors) can be shared by multiple photodetectors, transfer gates, and sense regions.

When an image is to be captured, an integration period for the pixel begins and the photodetector 802 accumulates photo-generated charge in response to incident light. When the integration period ends, the accumulated charge in the photodetector 802 is transferred to the sense region 806 by selectively pulsing the gate of the transfer transistor 804. Typically, the reset transistor 808 is used to reset the voltage on the sense region 806 (node 816) to a predetermined level prior to the transfer of charge from the photodetector 802 to the sense region 806. When charge is to be readout of the pixel, the gate of the row select transistor 812 is pulsed through the row select element 712 and row select line 714 to select the pixel (or row of pixels) for readout. The readout transistor 810 senses the voltage on the sense region 806 and the row select transistor 812 transmits the voltage (i.e., the pixel signal) to the output line 710.

In some embodiments, an image capture device, such as a camera, may not include a shutter over the lens, and so the image sensor may be constantly exposed to light. In these embodiments, the photodetectors may have to be reset or depleted before a desired image is to be captured. Once the charge from the photodetectors has been depleted, the transfer gate and the reset gate are turned off, isolating the photodetectors. The photodetectors can then begin integration and collecting photo-generated charge.

Figure 9:
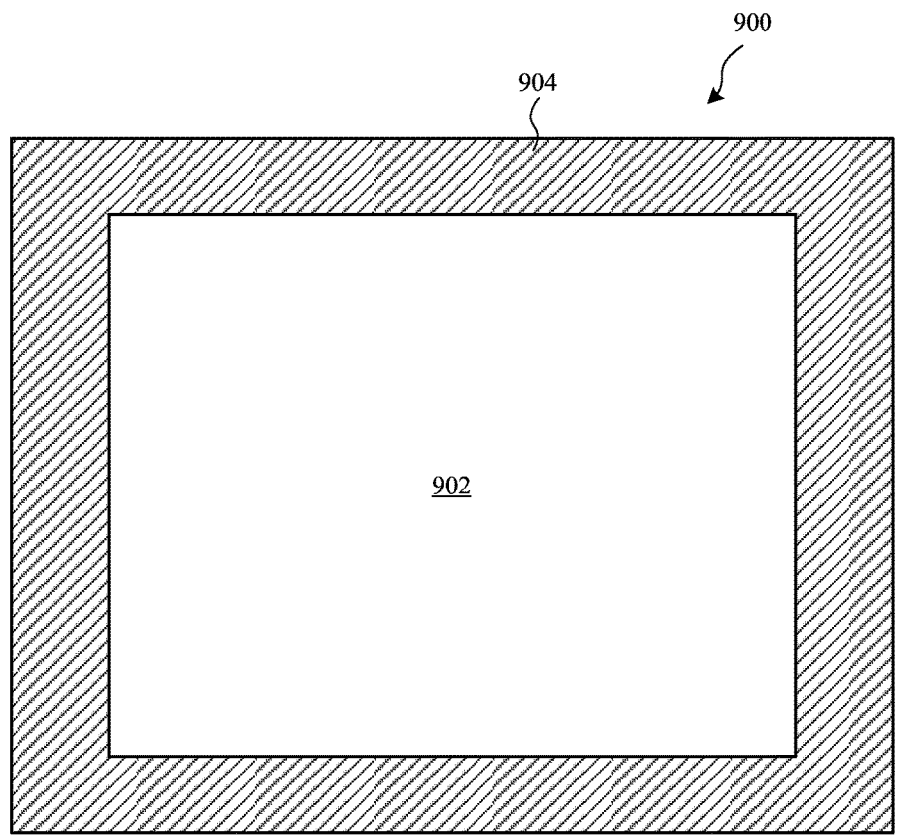
FIG. 9 shows a block diagram of a pixel array that is suitable for use as the pixel array 704 shown in FIG. 7.

FIG. 9 is a plan view of a pixel array that is suitable for use as the pixel array 704 shown in FIG. 7. The pixel array 900 includes an imaging pixel region 902 and a reference pixel region 904. The imaging pixel region 902 includes pixels that detect light and capture images. The pixel signals obtained from the pixels in the imaging pixel region 902 collectively form the captured image. The pixels in the imaging pixel region 902 can be implemented with any suitable pixel circuitry. For example, in one embodiment the pixels may be configured as shown in FIG. 8.

The reference pixel region 904 includes one or more reference pixels that are blocked from receiving light. As one example, an opaque layer (not shown) can be disposed over the reference pixel(s) in the reference pixel region 904. In some embodiments, the opaque layer can be a light shield made of a metal or another opaque material. The reference pixels can be configured similar to the pixels in the imaging pixel region 902 (e.g., same components and circuitry), or the reference pixels can have a different implementation compared to the pixels in the imaging pixel region 902.

Those skilled in the art will recognize that the reference pixel region 904 shown in FIG. 9 is only an example of an arrangement for a reference pixel region. Other embodiments can include one or more reference pixel regions that can be included at any suitable location in or around a pixel array. The reference pixel regions can be contiguous or distributed at different locations. Each reference pixel region can include one or more reference pixels.

When an image is captured by the pixels in the imaging pixel region 902, reference signals are read out of the reference pixels and the reference signals are used to adjust the pixel signals read out of the imaging pixel region 902. Since the reference pixels do not receive light, the reference signals contain substantially only dark current. As described earlier, the reference signals can be analyzed to determine a pedestal level for the image sensor. The pedestal level is added to the pixel signals so that the pixel signals in the darker regions of the image are equal to or near the pedestal level. In this manner, the pixel signals that are zero or near zero have a value at or near the pedestal level. The pixel signals that are not near zero are increased based on the addition of the pedestal level. After the pedestal level is added to the pixel signals, some of the pixel signals may be clipped at a maximum digital code (e.g., $2^{N-1}$, where N is the number of bits in the digital code). Thus, the range of the pixel signals begins at the pedestal level and ends at the maximum digital code. The pedestal level can be selected so that a minimum number of digital codes are not used in the distribution of the dark current. Minimizing the number of unused digital codes can reduce or prevent the dark current from clipping at zero.

Figure 10:
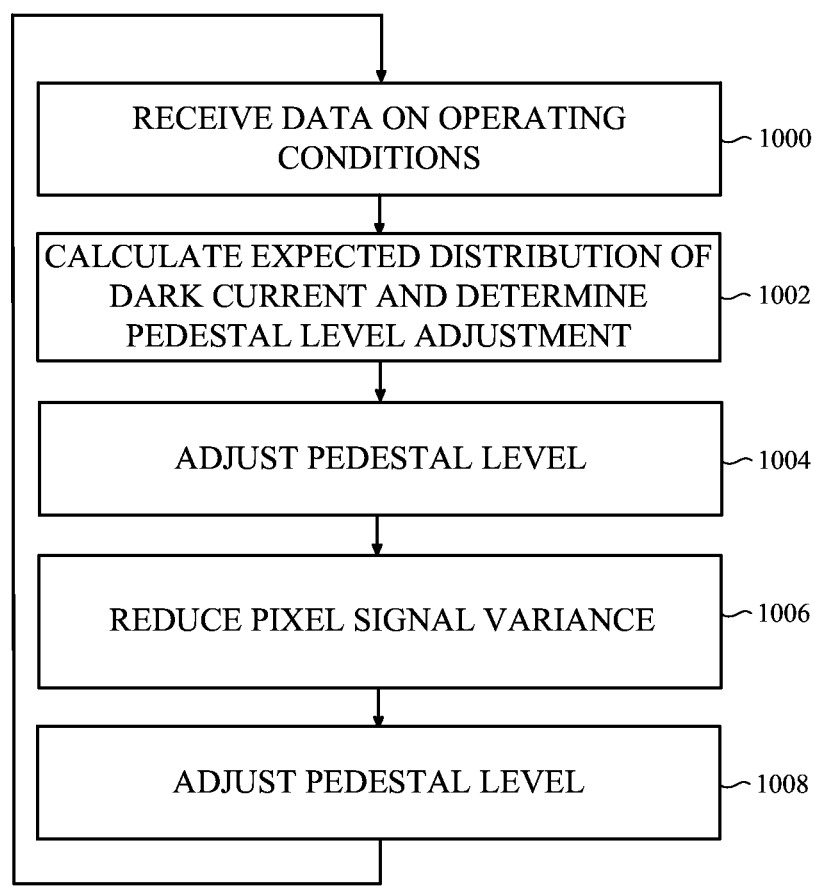
FIG. 10 shows a flowchart of a first method of dynamically adjusting a pedestal level in an image sensor.

FIG. 10 shows a flowchart of a first method of dynamically adjusting a pedestal level in an image sensor. Initially, as shown in block 1000, a processor receives data relating to the operating conditions of the image sensor. In one embodiment, the data includes the temperature of the image sensor, the gain of at least one amplifier in processing circuitry operably connected to the pixels, and the length of the integration time for the pixels. In some embodiments, the processor is the processor 500 shown in FIG. 5. In other embodiments, the process is the image processor 702 shown in FIG. 7.

As described earlier, the distribution of the dark current and the mean of the dark current can change based on the operation conditions of the image sensor. Based on the received operating conditions data, the processor determines an expected distribution of the dark current for the pixels at block 1002. Based on the expected distribution of the dark current, the processor can determine an adjustment amount for the current pedestal level. The pedestal level adjustment can be a positive or a negative amount that is added to the current pedestal level to produce an adjusted pedestal level that minimizes the number of unused digital codes.

In some embodiments, the processor analyzes the received operating conditions data with pre-determined image sensor characterization data to determine the expected distribution of the dark current. For example, the characterization data for an image sensor can be obtained when the image sensor is manufactured. In some embodiments, the characterization data and the associated pedestal levels can be obtained by testing each image sensor individually. The operation of an image sensor is tested at different temperatures, integration times, and gains. The image sensor can be operated in a dark environment so that only varying levels of dark current are measured. The pedestal levels associated with the different operating conditions can also be determined as part of the characterization process. In other embodiments, the characterization data and associated pedestal levels may be assigned to an image sensor based on the responses of a large number of similar image sensors (e.g., the same type of image sensor).

In some embodiments, the characterization data and the associated pedestal levels may be stored in memory (e.g., memory 502 in FIG. 5). As one example, the characterization data and the associated pedestal levels may be stored in a look-up table or database in the memory.

Returning to FIG. 10, the pedestal level is then adjusted with the pedestal level adjustment amount (block 1004). The pedestal level is adjusted to minimize the number of digital codes beneath the pedestal level. For example, the adjustment amount for the pedestal level may be selected so that the pedestal level maintains the number of digital codes needed to represent the lower region (e.g., the darker region of an image) of the dark current distribution.

In some embodiments, the number of digital codes used to represent the pedestal region (the region near the pedestal level) can be reduced at block 1006. The variance of the pixel signals can be reduced to permit the use of a lower pedestal level. For example, the pixel signals in an image may be filtered to reduce the standard deviation of the distribution of the pixel signals. In particular, the standard deviation of the pixels that are close to the pedestal level can be reduced. The standard deviation of the pixel signals within a given range of the pedestal level (e.g., the pedestal region) is reduced. Reducing the standard deviation reduces the number of digital codes that are needed to represent the pedestal level, which in turn reduces the number of digital codes that are below the pedestal level. This allows the pedestal level itself to be further lowered. An example filtering technique is described in more detail in conjunction with FIG. 12.

The pedestal level may then be further adjusted at block 1008. Similar to the adjustment in block 1004, the pedestal level is adjusted to minimize the number of digital codes beneath the pedestal level. The pedestal level may be selected so that the number of digital codes needed to represent the lower region of the dark current distribution (e.g., the darker region of an image) is maintained. The adjusted pedestal level may then be added to the pixel signals in the image.

The process can then return to block 1000. In some embodiments, the method is performed continuously while an image sensor is operating. In other embodiments, the method is performed at select times while an image sensor is operating. For example, the method may be performed periodically after a given amount of time has passed.

Other embodiments can perform the method shown in FIG. 10 differently by adding or omitting blocks. For example, blocks 1006 and 1008 can be omitted in some embodiments. In such embodiments, the adjusted pedestal level at block 1004 can be added to the pixel signals in an image. Alternatively, in some embodiments blocks 1000, 1002, and 1004 may be omitted. In such embodiments, the adjusted pedestal level at block 1008 can be added to the pixel signals in an image.

Figure 11:
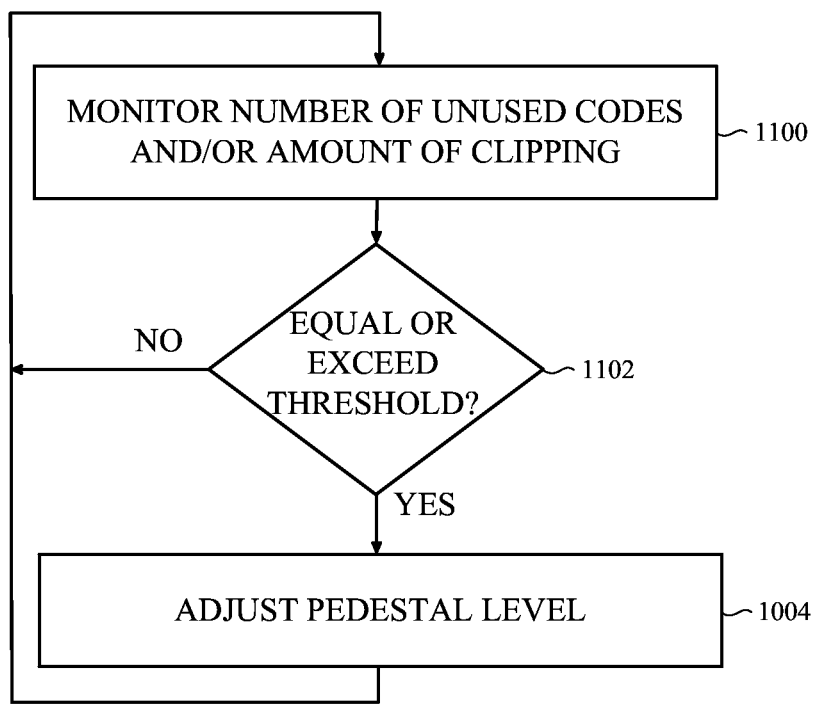
FIG. 11 shows a flowchart of an alternate method of dynamically adjusting a pedestal level in an image sensor.

FIG. 11 shows a flowchart of an alternate method of dynamically adjusting a pedestal level in an image sensor. In particular, in some embodiments blocks 1000 and 1002 in FIG. 10 can be replaced with blocks 1100 and 1102. In block 1100, the number of unused digital codes and/or the number of pixel signals that are clipped may be monitored by a processor or other suitable electronic component. A determination can then be made at block 1102 as to whether the number of unused digital codes and/or clipped pixel signals equals or exceeds a threshold amount. If not, the process returns to block 1100.

When the number of unused digital codes and/or clipped pixel signals equals or exceeds the threshold amount, the pedestal level is adjusted at block 1004 and the method returns to block 1100. In some embodiments, an adjustment amount for the pedestal level can be determined by the processor. In one embodiment, the processor may adjust the pedestal level based on the adjustment amount. In another embodiment, the processor can instruct the image sensor to select a different (e.g., higher or lower) pedestal level based on the adjustment amount.

In some embodiments, blocks 1006 and 1008 are performed after block 1004 in FIG. 11. Additionally or alternatively, various combinations of the one or more operating conditions, the pre-determined image sensor characterization data, the number of unused digital codes, and the number of clipped pixel signals can be analyzed or monitored when determining whether to adjust a pedestal level. As one example, one or more operating conditions and the number of unused digital codes may be analyzed. In another example, one or more operating conditions, the pre-determined image sensor characterization data, and the number of clipped pixel signals can be analyzed. And in yet another example, all four parameters or characteristics may be analyzed when determining whether to adjust the pedestal level.

The method of FIG. 11 can be performed continuously and/or at select times while an image sensor is operating. For example, the method may be performed periodically after a given amount of time has passed.

Figure 12:
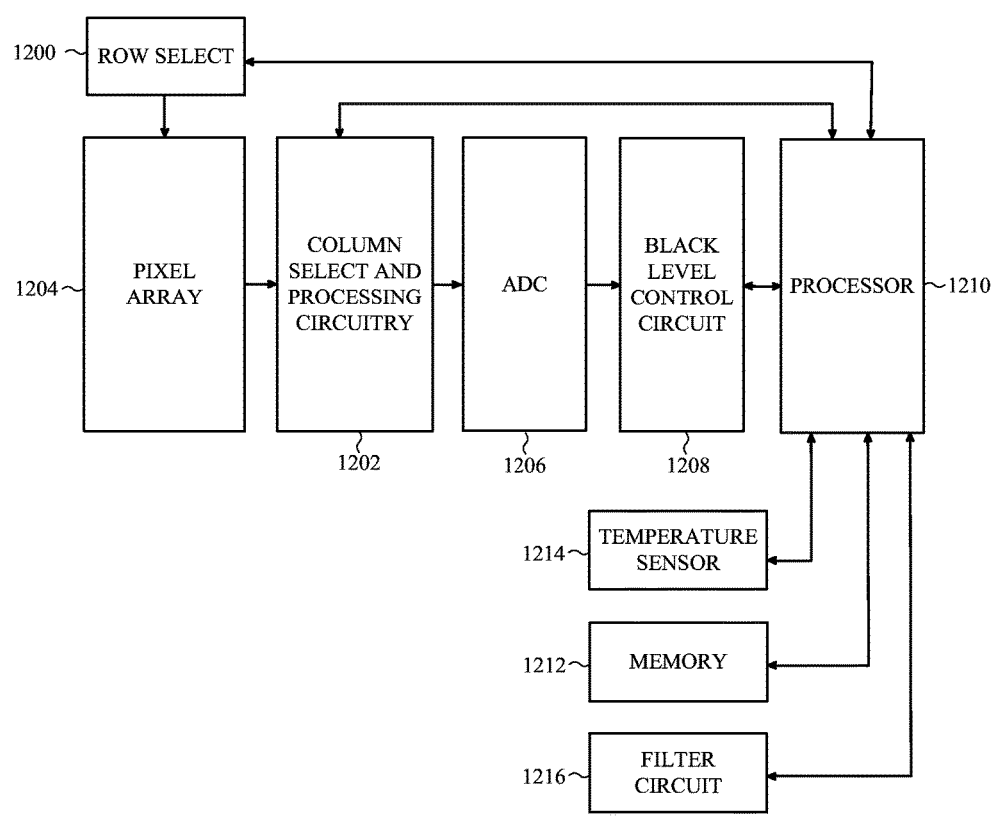
FIG. 12 shows a simplified block diagram of an example system that is configured to perform the method shown in FIG. 10.

FIG. 12 shows a simplified block diagram of an example system that is configured to perform the method shown in FIG. 10. The system includes a row select element 1200 and a column select and processing circuitry 1202 operably connected to an array of pixels 1204. The column select and processing circuitry 1202 can include one or more amplifiers that each applies a gain to the pixel signals produced by or read out of the pixel array 1204.

One or more analog-to-digital converters (ADC) 1206 are operably connected to the output(s) of the column select and processing circuitry 1202. When the pixel signals are read out of the pixels using the column select and processing circuitry 1202, the one or more ADCs 1206 convert the pixels signals to digital pixels signals. A black level control circuit (or circuits) 1208 is operably connected to the output(s) of the ADCs 1206. As described earlier, in some embodiments the black level control circuit(s) can control or maintain the mean of the dark current distribution at or near the pedestal level.

A processor 1210 (e.g., processor 500 or image processor 702) is operably connected to the black level control circuit, 1208, the row select element 1200, the column select and processing circuitry 1202, one or more temperature sensors 1212, memory 1214, and a filter circuit 1216. The memory 1214 can store the characterization data and associated pedestal levels. As described earlier, the characterization data and associated pedestal levels may be stored in a look-up table in the memory 1214.

The optional filter circuit 1216 can perform the process shown in block 1006 in FIG. 10. The filter circuit 1216 can reduce the number of digital codes needed to represent the image or the pedestal region. An example filter circuit is described in more detail in conjunction with FIG. 13. In some embodiments, the filter circuit 1216 can be incorporated in the processor 1210.

The one or more temperature sensors 1212 measure the temperature of the image sensor die or substrate. At least one temperature sensor can be incorporated in an image sensor itself (i.e., on the substrate) and/or at least one temperature sensor can be operably connected to an image sensor. The processor 1210 can receive temperature measurement signals from the one or more temperature sensors.

The processor 1210 can be configured to determine or control the length of the integration period of the pixels in the pixel array 1204 and the gain values used by the amplifiers in the column select and processing circuitry 1202. Based on the operating conditions (e.g., the temperature measurement signals, the length of the integration period, the gain values) and the characterization data, the processor 1210 can determine the expected distribution of the dark current and determine an adjustment amount for the pedestal level based on the given operating conditions. The processor 1210 can then adjust the current pedestal level to an adjusted pedestal level.

In embodiments that include the filter circuit 1216, the processor 1210 can receive the reduced number of digital codes prior to adjusting the pedestal level. The processor 1210 can select an adjusted pedestal level (or an adjustment amount for the pedestal level) based on the reduced number of digital codes.

Alternatively, in some embodiments, the processor 1210 can instruct the image sensor to select a higher or lower pedestal level based on the adjustment amount or the adjusted pedestal level.

The one or more ADCs 1206, the black level control circuit 1208, the processor 1210, the temperature sensor(s) 1212, and/or the memory 1214 can be included in an image sensor or may be operably connected to the image sensor. Additionally or alternatively, the black level control circuit 1208 can be incorporated into an image processor (e.g., 702 in FIG. 7) or in a device or system processor (e.g., 500 in FIG. 5). In some embodiments, the functions of the black level control circuit 1208 can be distributed between an image processor and a system processor.

Figure 13:
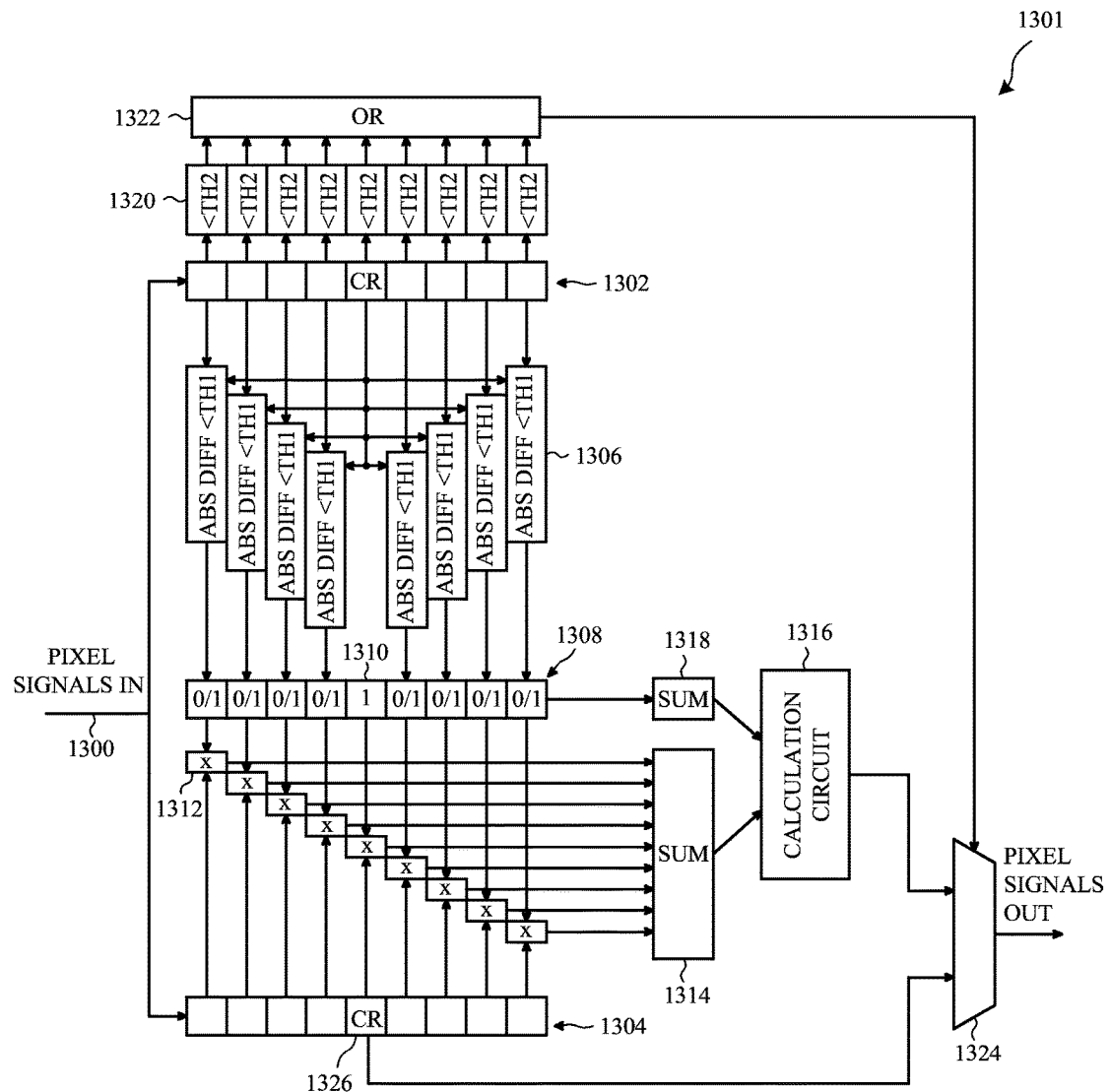
FIG. 13 shows an example block diagram of a filter circuit that can be used to perform block 1004 shown in FIGS. 10 and 11.

FIG. 13 shows an example block diagram of a bilateral filter circuit that can be used to perform block 1004 shown in FIGS. 10 and 11. The bilateral filter circuit filters the pixel signals near the pedestal level to reduce the standard deviation of the pixel signals. Reducing the standard deviation can permit an even lower pedestal level to be used because fewer digital codes are needed to represent the dark current values below the pedestal level.

The filter circuit 1301 is described in conjunction with pixels that include a color filter array having red, blue, and green pixels. One example of such as color filter array is a Bayer color filter array. A different type of a color filter array can be used in other embodiments. For example, a cyan, magenta, and yellow color filter array may be used.

The illustrated filter circuit 1301 operates on signed pixel signals (positive and negative values) to tighten the distribution of pixels around zero and minimize the amplitude of the most negative value. Initially, the pixel signals are received on signal line 1300 and shifted through a first set of registers 1302 and a second set of registers 1304. Although FIG. 13 depicts the first and second sets of registers as including nine registers, other embodiments are not limited to this number of shift registers. The pixels signals in the first and second sets of registers 1302, 1304 correspond to the same color. For example, the nine registers in the first and second sets of registers 1302, 1304 can include pixel signals associated with the color green. After the green pixel signals are processed, pixels signals associated with the color red can be analyzed, followed by the pixel signals associated with the color blue. In other embodiments, the number of filter circuits can equal the number of colors in a color filter array such that the filter circuits process the pixel signals for all of the colors substantially simultaneously.

Each pixel signal in the first set of registers 1302 is analyzed to determine if a difference between a respective pixel signal and the pixel signal value in the center register CR is less than a first programmable threshold. The first programmable threshold represents a maximum difference value between a respective pixel signal in the first set of registers 1302 and the pixel signal in the center register CR.

The difference comparison 1306 is an absolute value test that determines if each pixel signal in the first set of registers 1302 is less than the first programmable threshold (away from the value CR). When a pixel difference signal is less than the first threshold, a value of one is stored in a corresponding register in a third set of registers 1308 for that pixel signal. The value one is stored in the register 1310 (the register associated with the center register CR) because the difference value associated with the pixel signal in the center register CR will always be zero. In other words, subtracting the pixel signal in the center register CR from the pixel signal in the center register CR equals zero. When a pixel difference signal is greater than the first threshold, a value of zero is stored in a corresponding register in the third set of registers 1308 for that pixel signal.

The pixel signals are read from the second set of registers 1304 and received by respective multiplier circuits 1312. Each multiplier circuit 1312 multiplies its associated pixel signal by the corresponding value stored in the third set of registers 1308 (value is either a zero or a one). The signals output from each multiplier circuit 1312 will either be a zero or a pixel signal, depending on the value stored in a respective register 1308. The signals are received by the summing circuit 1314, which adds the signals together. The resulting sum represents a numerator number that will be used by the calculation circuit 1316.

The ones and zeros stored in the third set of registers 1308 are received by a second summing circuit 1318 and added together to produce a denominator number that is used by the calculation circuit 1316. The calculation circuit 1316 determines an average by dividing the numerator value by the denominator value. Principally, the average is an average of the pixel signal in the center register CR and all of the pixel signals that are near or close to the pixel signal in the center register CR by the first threshold. This average value represents a replacement pixel signal.

Each pixel signal in the first set of registers 1302 is also compared to a second programmable threshold 1320 to determine if the pixel signal is less than the second programmable threshold 1320. If any of the pixel signals are less than the second threshold, the OR circuit 1322 transmits a select signal to the multiplexer 1324 that causes the multiplexer 1324 to output the replacement pixel signal for a pixel signal (e.g., the right-most pixel in the first and second sets of registers 1302, 1304). As described previously, the replacement pixel signal is the average value determined by the calculation circuit 1316.

If none of the pixel signals are less than the second programmable threshold, the OR circuit 1322 transmits a select signal to the multiplexer 1324 that causes the multiplexer 1324 to output the original center pixel signal stored in the register 1326 of the second set of registers 1304 for the pixel signal. In this manner, either the center pixel signal or the replacement pixel signal is output from the multiplexer 1324 as the pixel signals are scanned or shifted through the first and second sets of registers.

After the pixel signals in the first and second registers 1302, 1304 have been analyzed, the pixel signals are shifted by one register. A new pixel signal is shifted into the leftmost register in the first and second sets of registers 1302, 1304. The pixel signal in the rightmost register is shifted out of the first and second sets of registers 1302, 1304. The process continues for all of the pixels in the pixel array. After all of the pixel signals have been processed by the filter 1301, the standard deviation of the distribution of the dark current for the pixels near zero may be reduced. As described earlier, the reduced standard deviation may permit an even lower pedestal level to be used because fewer digital codes are needed to represent the dark current values below the pedestal level.

The illustrated filter circuit 1301 operates in only one dimension (e.g., a row of pixels). Other embodiments can employ a two dimensional filter circuit (e.g., column and row) by adding line buffers. Additionally or alternatively, other embodiments can employ a different filtering technique to reduce the standard deviation. For example, a digital low pass filter, noise filter, or similar process or circuitry may be used to reduce the variance of dark current values in the distribution of the dark current. The filter circuit can operate in a signed signal space or the unsigned space. The filter circuit can operate in a digital code space that preserves the full range of the signal, including the digital codes below the pedestal level.

Figure 1:
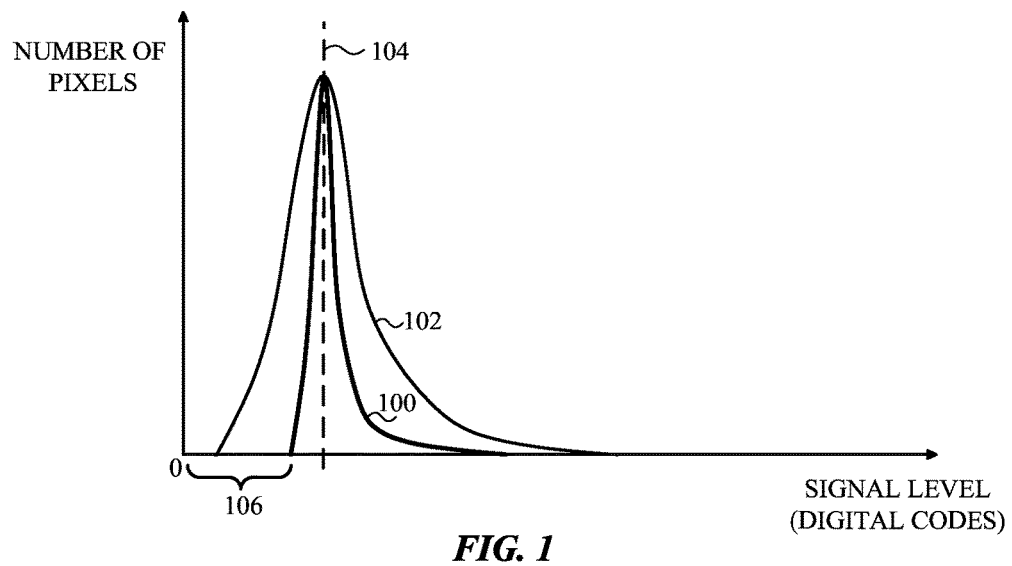
FIGS. 1 and 2 show example plots of distributions of dark current.
Figure 2:
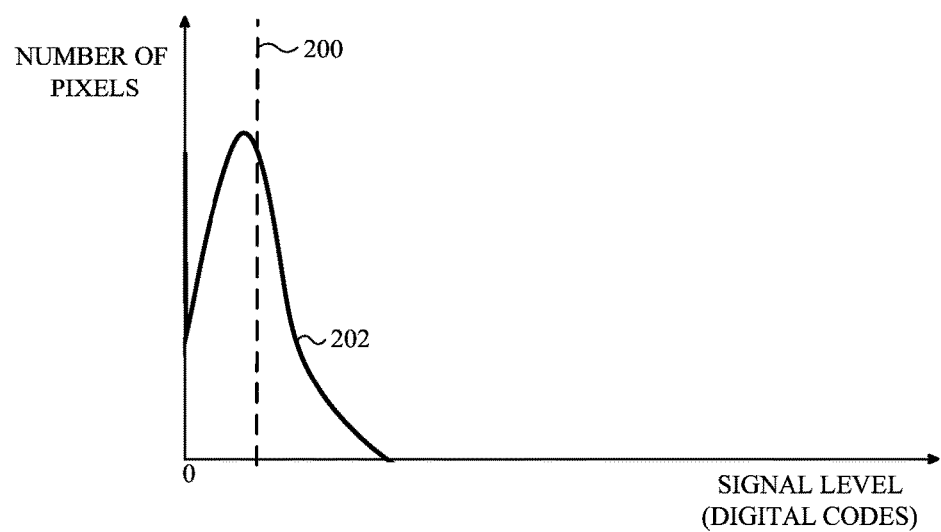
Figure 14:
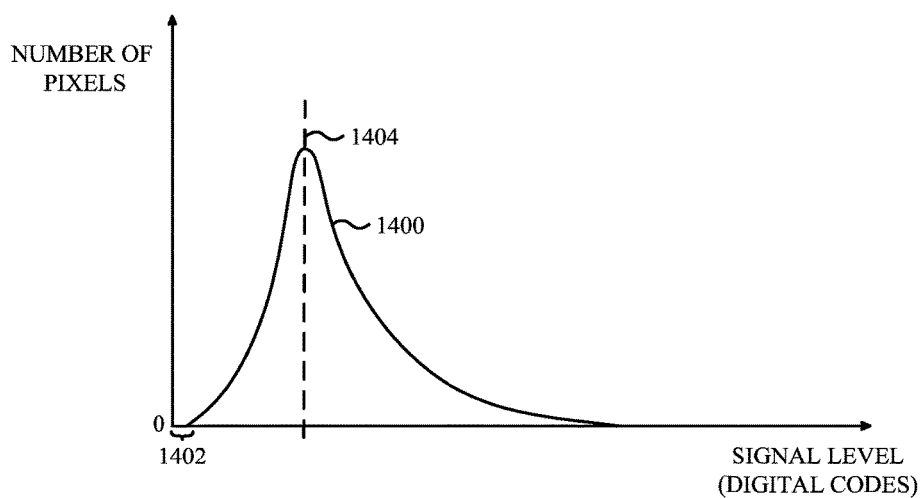
FIG. 14 shows an example plot of a distribution of dark current after a pedestal level in an image sensor is adjusted.

FIG. 14 shows an example plot of a distribution of dark current after a pedestal level in an image sensor is adjusted. The pedestal level can be adjusted using one of the previously described embodiments. The distribution 1400 approximately follows a Poisson distribution, and the number of unused digital codes is less than the embodiment shown in FIG. 1 (compare area 1402 with area 106). Since the method of FIG. 10 or FIG. 11 is performed periodically or continuously to dynamically adjust the pedestal level 1404, the pedestal level 1404 can change to a lower or higher digital code over time to prevent pixels from clipping at zero.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of dynamically adjusting a pedestal level in an image sensor, the method comprising:
   receiving, by a processor, data on one or more operating conditions associated with the image sensor;
   determining, by the processor, an expected distribution of dark current for the image sensor based on the one or more operating conditions;
   determining, by the processor, a first adjustment amount for the pedestal level based on the expected distribution of dark current;
   adjusting the pedestal level based on the first adjustment amount to produce an adjusted pedestal level;
   receiving, by the processor, digital pixel signals associated with pixel signals from a pixel array of the image sensor;
   filtering the digital pixel signals to reduce a standard deviation of a distribution of the digital pixel signals;
   determining a second adjustment amount for the adjusted pedestal level based on the reduced standard deviation; and
   adjusting the adjusted pedestal level based on the determined second adjustment amount;
   wherein the data on the one or more operating conditions is distinct from the digital pixel signals.

2. The method of claim 1, wherein the one or more operating conditions comprises a temperature of the image sensor.

3. The method of claim 1, wherein the one or more operating conditions comprises a gain of at least one amplifier operably connected to at least one pixel in the image sensor.

4. The method of claim 1, wherein the one or more operating conditions comprises a length of an integration time of at least one pixel in the image sensor.

5. The method of claim 1, wherein the one or more operating conditions comprise at least two of a temperature of the image sensor, a gain of at least one amplifier operably connected to at least one pixel in the image sensor, or a length of an integration time of at least one pixel in the image sensor.

6. The method of claim 1, wherein determining, by the processor, the first adjustment amount for the pedestal level based on the expected distribution of dark current comprises determining, by the processor, a value for the first adjustment amount for the pedestal level to minimize a number of unused digital codes that represent the dark current below the pedestal level.

7. The method of claim 1, wherein determining the expected distribution of dark current for the image sensor based on the one or more operating conditions further comprises:
   receiving pre-determined characterization data for the image sensor; and
   analyzing the operating conditions data with the pre-determined characterization data to determine the expected distribution of dark current.

8. A system, comprising:
   a pixel array;
   processing circuitry operably connected to the pixel array and configured to receive pixel signals from the pixel array, wherein the processing circuitry includes one or more amplifiers;
   an analog-to-digital converter configured to convert the received pixel signals to digital pixel signals;
   a filter circuit configured to filter the digital pixel signals to reduce a standard deviation of a distribution of dark current in the digital pixel signals;
   a temperature sensor; and
   a processor operably connected to the processing circuitry and the temperature sensor, wherein the processor is configured to dynamically determine a first adjustment amount for a pedestal level based on at least one of:
   a temperature received from the temperature sensor;
   a gain of at least one amplifier in the processing circuitry; or
   a length of an integration time of at least one pixel in the pixel array; and
   wherein:
      the processor is configured to adjust the pedestal level based on the determined first adjustment amount and
      the processor is configured to determine a second adjustment amount for the pedestal level based on the reduced standard deviation and to adjust the adjusted pedestal level based on the determined second adjustment amount.

9. The system of claim 8, wherein the pixel array is included in an image sensor and the processor is configured to instruct the image sensor to select a different pedestal level based on the determined adjustment amount and the reduced standard deviation.

10. The system of claim 8, wherein the pixel array is included in an image sensor and the system further comprises a memory that stores pre-determined characterization data for the image sensor.

11. The system of claim 10, wherein the processor is configured to read the pre-determined characterization data from the memory and dynamically determine the adjustment amount for the pedestal level based on at least one operating condition associated with the image sensor and the pre-determined characterization data.

12. A method of dynamically adjusting a pedestal level in an image sensor, the method comprising:
   receiving, at processing circuitry, first data on one or more operating conditions associated with the image sensor;
   determining, by the processing circuitry, a first expected distribution of dark current for the image sensor based on the first data and a first adjustment amount for the pedestal level based on the first expected distribution of dark current;
   applying the first adjustment amount to the pedestal level;
   receiving at the processing circuitry a set of digital pixel signals associated with an image signal from a pixel array of the image sensor;

filtering the set of digital pixel signals to reduce a standard deviation of the set of digital pixel signals;

applying a second adjustment amount to the pedestal level based on the reduced standard deviation;

receiving at the processing circuitry second data on the one or more operating conditions;

determining, by the processing circuitry, a second expected distribution of dark current for the image sensor based on the second data and a third adjustment amount for the pedestal level based on the second expected distribution of dark current;

applying the third adjustment amount to the pedestal level.

13. The method of claim 12, wherein the set of digital pixel signals comprises a subset of digital pixel signals associated with a single color, and filtering the set of digital pixel signals comprises:

comparing a respective digital pixel signal in the subset of digital pixel signals to a given digital pixel signal in the subset of digital pixel signals to determine if a difference between the respective digital pixel signal and the given digital pixel signal is less than a first threshold;

if the difference between the respective digital pixel signal and the given digital pixel signal is less than the first threshold, including the respective digital pixel signal in a calculation of an average of the digital pixel signals in the subset of digital pixel signals that are less than the first threshold, wherein the average comprises a replacement digital pixel signal;

determining if at least one digital pixel signal in the subset of digital pixel signals is less than a second threshold;

if at least one digital pixel signal in the subset of digital pixel signals is less than the second threshold, outputting the replacement digital pixel signal as a digital pixel signal; and if at least one digital pixel signal in the subset of digital pixel signals is not less than the second threshold, outputting the given digital pixel signal in the subset of digital pixel signals as the digital pixel signal.

14. The method of claim 13, further comprising:

shifting the subset of digital pixel signals into at least one shift register prior to the comparing.

15. The method of claim 14, wherein the given digital pixel signal comprises a digital pixel signal in a center register in the shift register.

16. The method of claim 12, wherein the second adjustment amount applied to the pedestal level, based on the reduced standard deviation, is chosen to minimize a number of unused digital codes that represent the dark current below the pedestal level.

17. The method of claim 12, further comprising:

reading a set of analog pixel signals out of an image sensor; and converting the set of analog pixel signals to the set of digital pixel signals.

18. The method of claim 12, wherein the filtering is performed in a signed signal space.

19. The method of claim 12, wherein the filtering comprises at least one of digital low pass filtering or noise filtering.

* * * * *